United States Patent
Higuchi et al.

(10) Patent No.: US 8,009,623 B2
(45) Date of Patent: Aug. 30, 2011

(54) BASE STATION, USER APPARATUS AND METHOD FOR USE OF MULTIPLE SIZES OF RESOURCE BLOCKS

(75) Inventors: Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 385 days.

(21) Appl. No.: 12/305,149

(22) PCT Filed: Jun. 14, 2007

(86) PCT No.: PCT/JP2007/062055
§ 371 (c)(1),
(2), (4) Date: Mar. 4, 2009

(87) PCT Pub. No.: WO2007/148611
PCT Pub. Date: Dec. 27, 2007

(65) Prior Publication Data
US 2010/0062782 A1    Mar. 11, 2010

(30) Foreign Application Priority Data
Jun. 19, 2006    (JP) ................................. 2006-169428

(51) Int. Cl.
*H04W 4/00*    (2009.01)
*H04J 1/00*    (2006.01)
(52) U.S. Cl. ......................... 370/329; 370/342; 370/343
(58) Field of Classification Search .................. 370/329, 370/342, 343
See application file for complete search history.

(56) References Cited

U.S. PATENT DOCUMENTS

| 6,031,827 | A | * | 2/2000 | Rikkinen et al. ............... 370/330 |
| 2005/0135324 | A1 | * | 6/2005 | Kim et al. ...................... 370/343 |
| 2007/0189199 | A1 | | 8/2007 | Nishio |
| 2009/0060081 | A1 | * | 3/2009 | Zhang et al. .................. 375/267 |
| 2009/0303938 | A1 | * | 12/2009 | Kim et al. ...................... 370/329 |
| 2010/0097998 | A1 | | 4/2010 | Nishio et al. |

FOREIGN PATENT DOCUMENTS

| CN | 1768497 A | 5/2006 |
| EP | 1612980 A1 | 1/2006 |
| JP | 09-205411 A | 8/1997 |
| JP | 10-190621 A | 7/1998 |
| JP | 2004-312291 A | 11/2004 |
| WO | 2005/096522 A1 | 10/2005 |
| WO | 2006/059565 A1 | 6/2006 |

OTHER PUBLICATIONS

International Search Report w/translation from PCT/JP2007/062055 dated Sep. 25, 2007 (3 pages).
3GPP TR 25.814, V7.0.0; "Physical Layer Aspects for Evolved Universal Terrestrial Radio Access (UTRA) (Release 7)"; Jun. 2006 (126 pages).

(Continued)

*Primary Examiner* — Kenny Lin
(74) *Attorney, Agent, or Firm* — Osha • Liang LLP

(57) ABSTRACT

A base station includes a scheduler at least determining a resource block assigned to a data channel, a transmitted signal generation unit generating a signal to transmit the data channel in accordance with scheduling information supplied from the scheduler, a transmission unit transmitting the signal to a user apparatus, and a resource block size adjustment unit adjusting a size of the resource block.

12 Claims, 8 Drawing Sheets

OTHER PUBLICATIONS

Japanese Office Action for Application No. 2006-169428, mailed on Nov. 24, 2009 (5 pages).
Patent Abstracts of Japan for Japanese Publication No. 09-205411, publication date Aug. 5, 1997 (1 page).
Patent Abstracts of Japan for Japanese Publication No. 10-190621, publication date Jul. 21, 1998 (1 page).
Written Opinion from PCT/JP2007/062055 dated Sep. 25, 2007 (9 pages).
Extended European Search Report for Application No. 07745312.4, mailed on May 18, 2011, (8 pages).
Texas Instrument: "Impact of Sub-Band Size Selection on CQI Measurement Error and Downlink E-UTRA Throughput", 3GPP TSG RAN WG1 Ad Hoc on LTE3; R1-060065, Helsinki, EU Jan. 23-25, 2006.
LG Electronics: "Downlink Resource Allocation in EUTRA", 3GPP TSG RAN WG1 AH on LTE; R1-060052, Helsinki, Finland Jan. 23-25, 2006.
Chinese Office Action for Application No. 200780030185.9, mailed on Mar. 22, 2011 (15 pages).
esp@cenet Patent Abstract for Chinese Publication No. 1768497, publication date May 3, 2006. (1 page).
Russian Office Action for Application No. 2009101074/09, mailed on May 20, 2011 (12 pages).

* cited by examiner

FIG.1
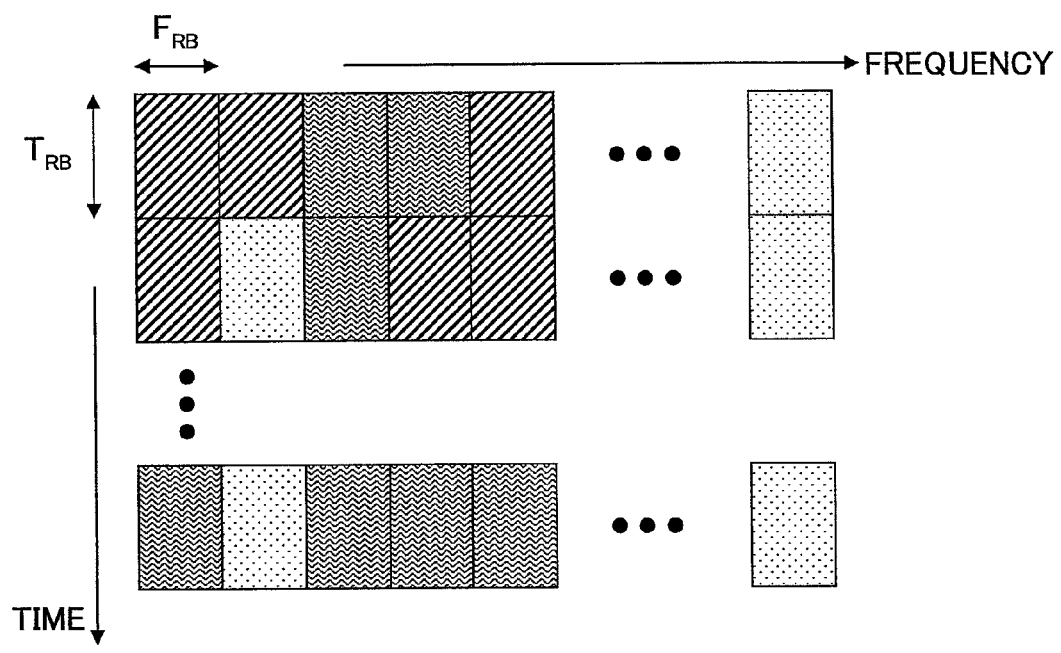
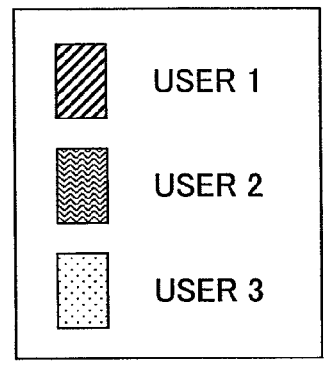

FIG.2

| | LARGER RESOURCE BLOCK SIZE | SMALLER RESOURCE BLOCK SIZE |
|---|---|---|
| EFFECT ON IMPROVEMENT OF THROUGHPUT BY SCHEDULING | LOW | HIGH |
| SIGNALING OVERHEAD | LOW | HIGH |
| EFFICIENCY IN ACCOMMODATION OF SMALL TRAFFIC DATA (VoIP, TCP, ACK, e.g.) | LOW | HIGH |

BASE STATION, USER APPARATUS AND METHOD FOR USE OF MULTIPLE SIZES OF RESOURCE BLOCKS

TECHNICAL FIELD

The present invention relates to the technical field of mobile communication and more particularly relates to base stations, user apparatuses and methods for use of multiple sizes of resource blocks.

BACKGROUND ART

In this technical field, research and development on next generation communication schemes have been accelerated. In the next generation communication systems, both time scheduling and frequency scheduling are employed for resource allocation to user apparatuses in order to improve utilization efficiency of radio resources.

FIG. 1 shows an exemplary assignment of radio resources to three or more users. As illustrated, the radio resources are assigned in the unit of blocks, for example, with a bandwidth $F_{RB}$ of 375 kHz and a time duration $T_{RB}$ of 0.5 ms. Such a block is called "a resource block (RB)" or "a chunk". The data transmission efficiency (throughput) in entire systems can be improved through priority assignment of one or more resource blocks to users with better channel conditions in terms of frequency direction and time direction axes. Base stations are responsible to determine which resource blocks are assigned to which users, which is referred to as scheduling. In the scheduling, in addition to the quality of channel conditions, some fairness criteria may be taken into account. Conventional scheduling and resource blocks are described in detail in the reference 3GPP TR25.814.

DISCLOSURE OF INVENTION

Problem to be Solved by the Invention

The present inventors took notice of some relationship among resource block sizes, scheduling effects, signaling overhead and resource utilization efficiency in the course of fundamental research.

FIG. 2 shows an exemplary table of the relationship. As illustrated in the first row in the table, a smaller resource block size can fulfill granular assignment of resource blocks depending on the quality of channel conditions, which may improve throughput of the entire system. On the other hand, a larger resource block size makes it difficult to assign the resource blocks in fine granularity, which may achieve relatively less improvement of the throughput of the entire system. In general, although larger channel variations may be observed in the frequency direction than in the time direction, the relationship between the resource block sizes and the throughput may have similar tendency in any of the frequency direction and the time direction.

As illustrated in the second row in the table, a smaller resource block size leads to a larger number of resource blocks, resulting in a larger amount of information used for scheduling information indicating which of the resource blocks should be used for which users. In other words, such a smaller resource block size may increase signaling overhead. On the other hand, a larger resource block size leads to a lesser number of resource blocks, resulting in less signaling overhead.

As illustrated in the third row in the table, in cases of transmission of smaller size data such as voice packets (VoIP) or simple acknowledgements (ACK, NACK), a larger resource block size may cause waste of resources because one resource block is used for one user. Thus, a reasonably small resource block size may reduce the waste of resources.

In this manner, it may be hard to determine a better resource block size from all the viewpoints of effects of throughput improvement of the entire system, less signaling overhead and resource utilization efficiency. However, currently envisaged next generation communication systems provide one size of resource block. Thus, any of the above viewpoints may be sacrificed depending on communication situations.

One object of the present invention is to improve transmission efficiency of various sizes of data and use resources effectively while reducing the signaling overhead.

Means for Solving the Problem

A base station according to the present invention includes a scheduler at least determining a resource block assigned to a data channel, a transmitted signal generation unit generating a signal to transmit the data channel in accordance with scheduling information supplied from the scheduler, a transmission unit transmitting the signal to a user apparatus, and a resource block size adjustment unit adjusting a size of the resource block.

Advantage of the Invention

According to the embodiments of the present invention, it is possible to improve transmission efficiency of various sizes of data and use resources effectively while reducing the signaling overhead.

BRIEF DESCRIPTION OF DRAWINGS

FIG. 1 is a schematic diagram illustrating an exemplary assignment of resources to three or more users;

FIG. 2 shows an exemplary table indicating relationship among resource block sizes, scheduling effects, signaling overheads and resource utilization efficiency;

LIST OF REFERENCE SYMBOLS

Figure 3:
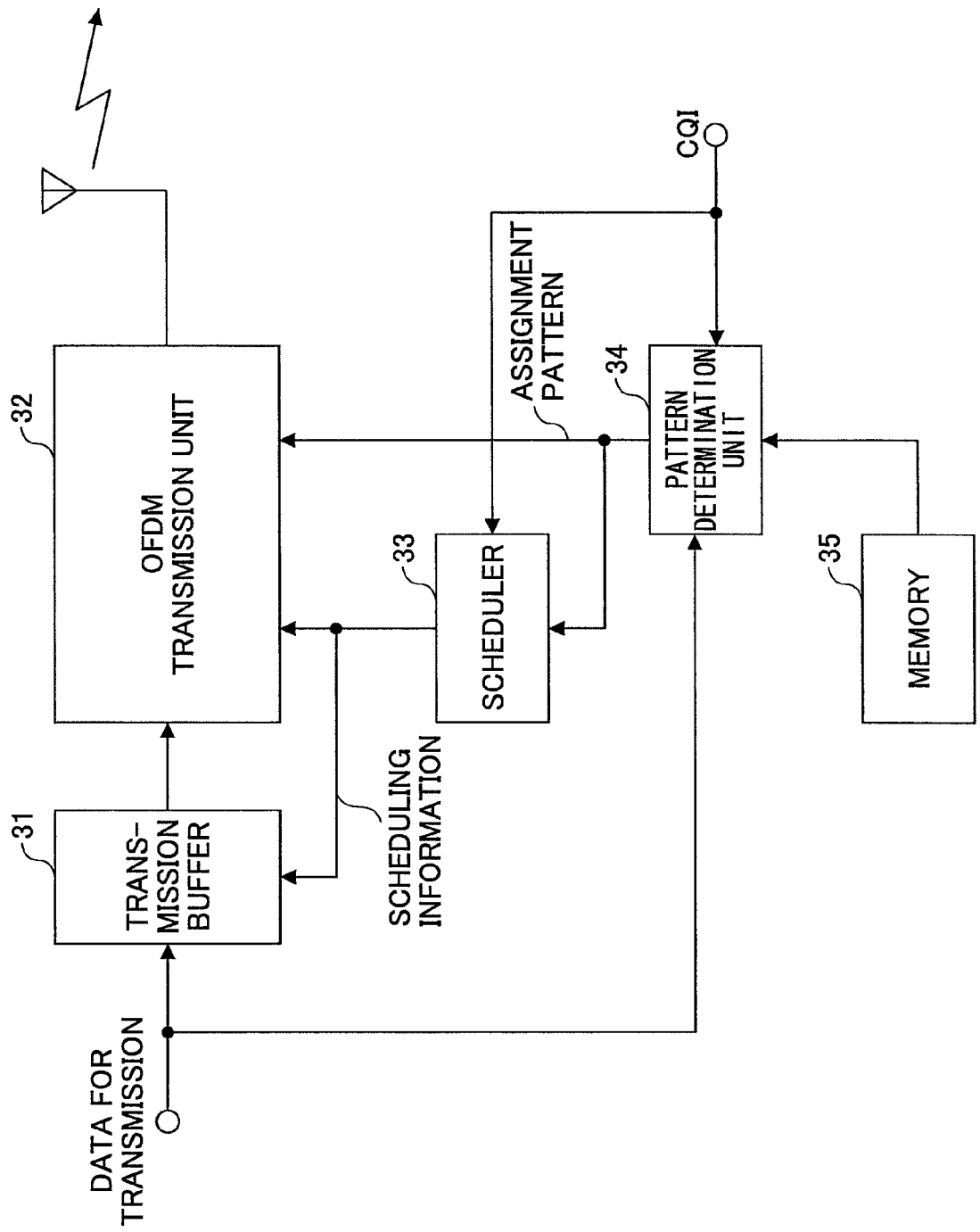
FIG. 3 is a block diagram illustrating a transmission unit in a base station according to one embodiment of the present invention.

31: transmission buffer
32: OFDM transmission unit
33: scheduler
34: pattern determination unit
35: memory
41: OFDM reception unit
42: resource identification unit 43: assignment pattern identification unit
44: memory
45: CQI measurement unit

BEST MODE FOR CARRYING OUT THE INVENTION

FIG. 3 is a block diagram illustrating a transmission unit in a base station according to one embodiment of the present invention. In FIG. 3, a transmission buffer 31, an OFDM transmission unit 32, a scheduler 33, a pattern determination unit 34 and a memory 35 are illustrated.

The transmission buffer 31 stores data for downlink transmission and supplies the data in accordance with scheduling information.

The OFDM transmission unit 32 generates signals to transmit the data for downlink transmission in the air in accordance with the scheduling information. Specifically, the transmitted data may be encoded at a specified channel code rate, modulated in accordance with a specified data modulation scheme such as 16QAM, further modulated in accordance with OFDM scheme in fast inverse Fourier transform and transmitted together with an attached guard interval from an antenna.

The scheduler 33 conducts time scheduling and frequency scheduling based on a channel quality indicator (CQI) on a downlink channel reported from a user apparatus and an indicated resource block size and then generates scheduling information. Based on the downlink CQI, the scheduler 33 determines the scheduling information to assign resource blocks to users with better channel conditions. The scheduling information includes not only information indicating which resource blocks are assigned to which users but also information indicating a combination of a modulation scheme and a channel code rate (MCS number). In order to determine the scheduling information, in addition to the CQI, the amount of untransmitted data in the transmission buffer 31 and/or some fairness indicators may be taken into account.

The pattern determination unit 34 adjusts the size of resource blocks based on either or both of the data size of the transmitted data and the CQI. In this embodiment, two different sizes of resource blocks are available, and either of them may be selected depending on the data size and the CQI.

The memory 35 stores an assignment pattern of resource blocks. Such an assignment pattern of resource blocks and exemplary applications thereof will be described below.

Figure 4:
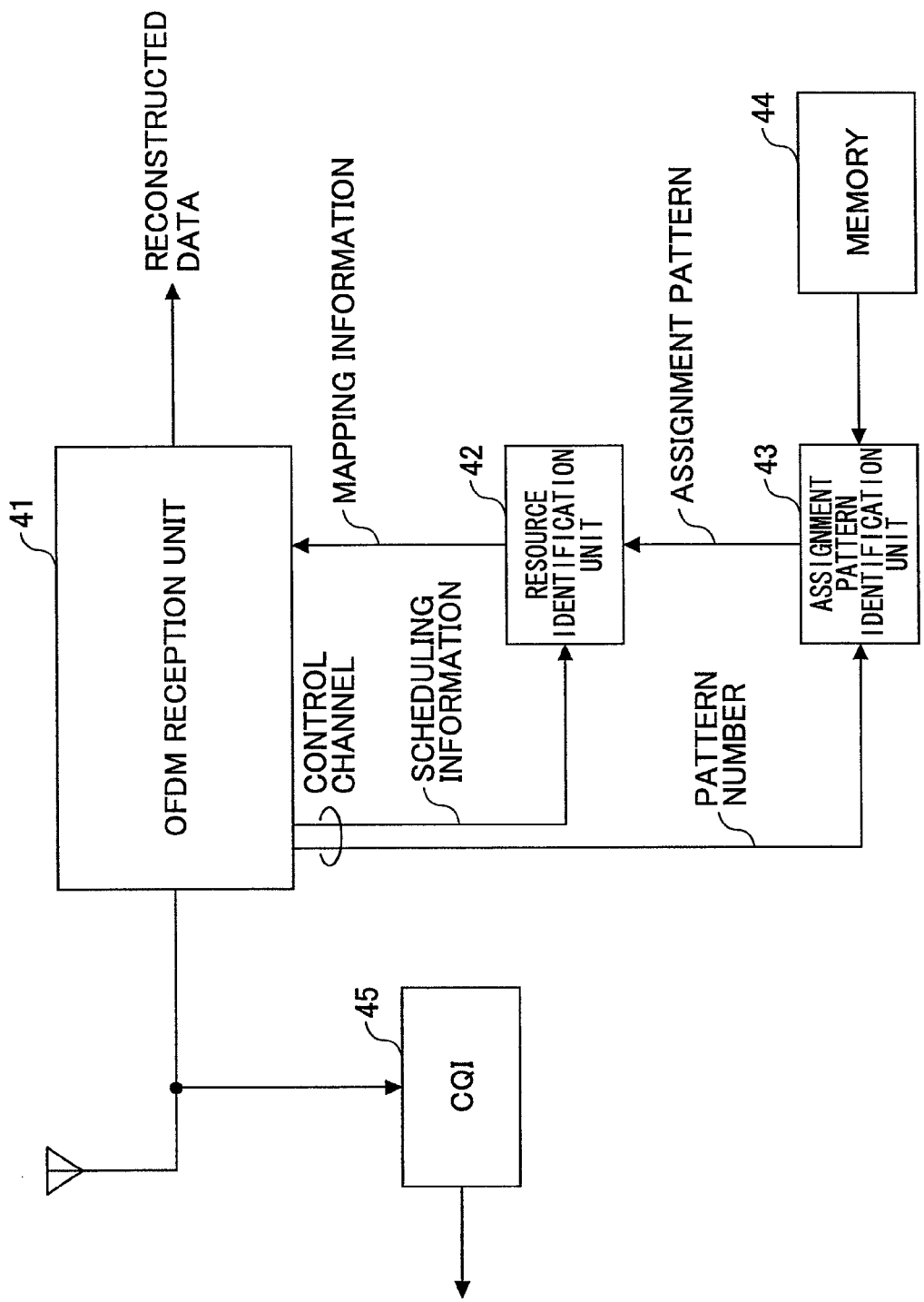
FIG. 4 is a block diagram illustrating a reception unit in a user apparatus according to one embodiment of the present invention.

FIG. 4 is a block diagram illustrating a reception unit of a user apparatus according to one embodiment of the present invention. In FIG. 4, an OFDM reception unit 41, a resource identification unit 42, an assignment pattern identification unit 43, a memory 44 and a CQI measurement unit 45 are illustrated.

The OFDM reception unit 41 derives a control data channel and a traffic data channel from a received signal. Specifically, the OFDM reception unit 41 modulates the received signal in accordance with the OFDM scheme through fast Fourier transform, performs data demodulation and channel decoding in accordance with scheduling information transmitted from a base station and derives the control data channel and/or the traffic data channel.

The resource identification unit 42 generates mapping information for specifying the positions of resource blocks on the time axis and the frequency axis based on the scheduling information and an assignment pattern of the resource blocks.

The assignment pattern identification unit 43 extracts the assignment pattern corresponding to a pattern number transmitted from the base station.

The memory 44 stores the assignment pattern of resource blocks together with the pattern number.

The CQI measurement unit 45 receives a CQI for the received signal. The measured downlink CQI is reported to the base station at a predefined frequency.

Operations of the base station and the user apparatus according to one embodiment of the present invention is described with reference to FIGS. 3 and 4 in detail below. Data for transmission is stored in the transmission buffer 31 and supplies to the OFDM transmission unit 32 in accordance with scheduling information. The OFDM transmission unit 32 conducts some operations on the data, such as channel encoding, data modulation, mapping to resource blocks and inverse fast Fourier transform in order to convert into a signal for radio transmission. The scheduling information may specify a channel encoding scheme, a data modulation scheme and resource blocks. In this embodiment, different sizes of resource blocks are used as needed.

Figure 5:
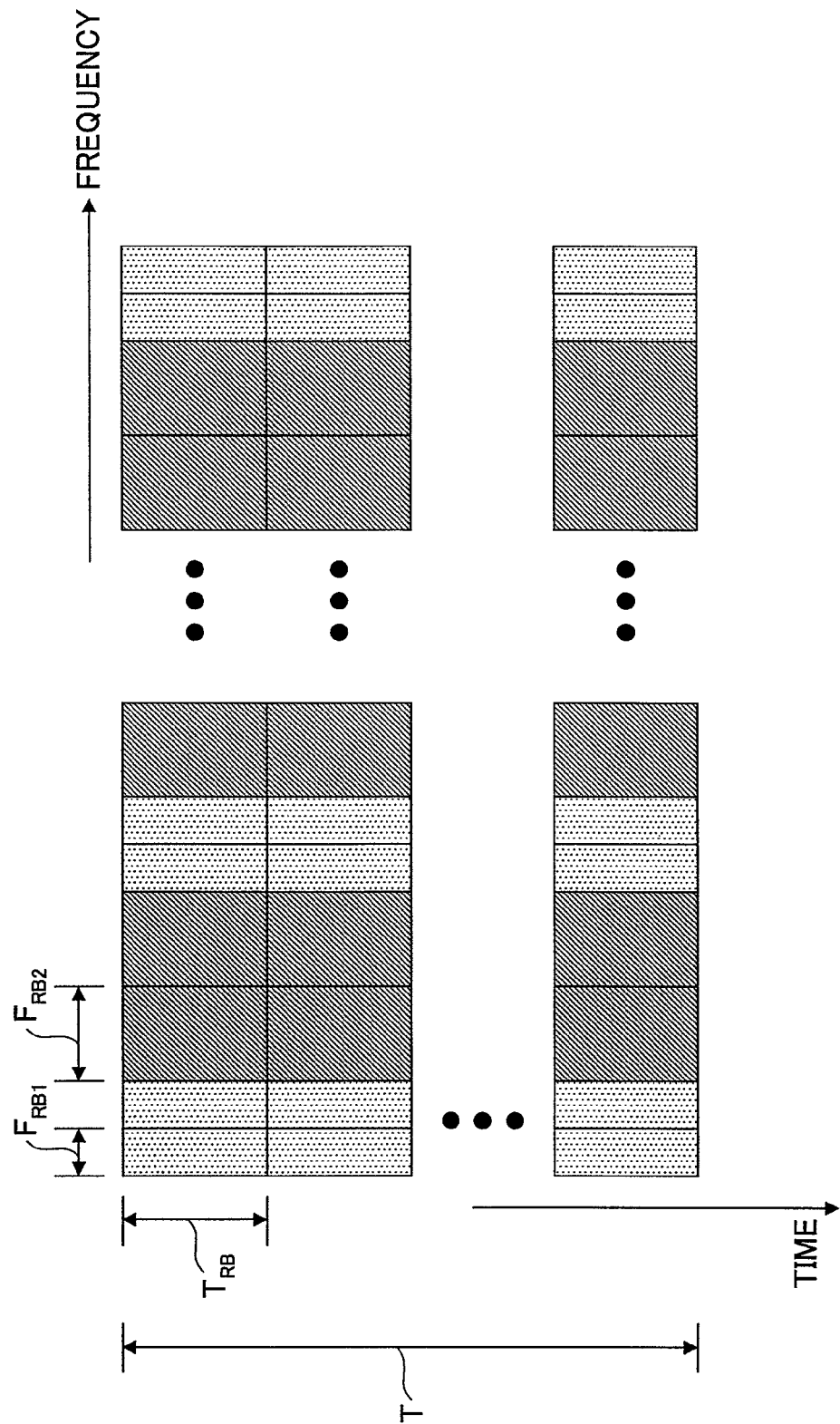
FIG. 5 shows exemplary utilization of different sizes of resource blocks.
Figure 6:
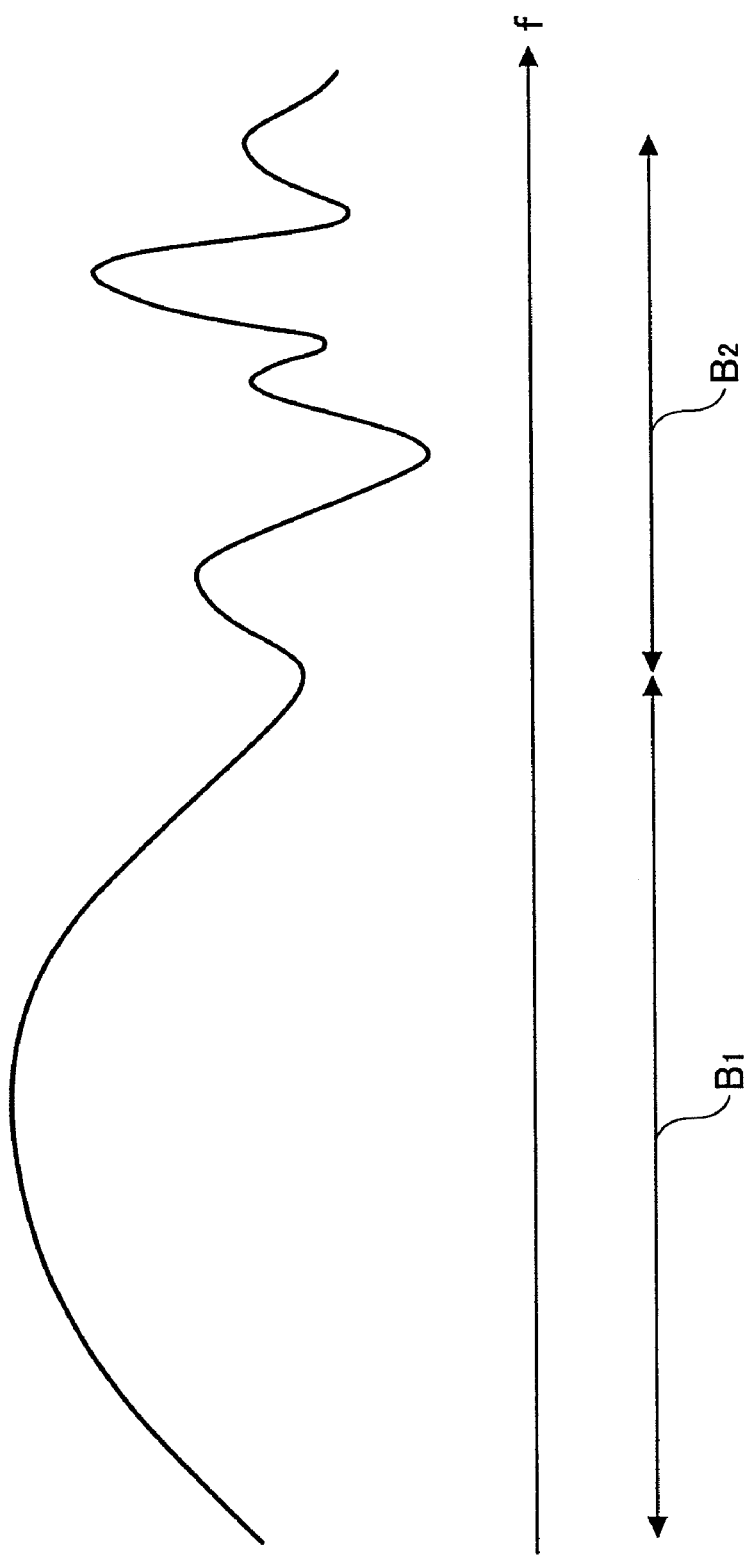
FIG. 6 is a schematic diagram illustrating a sharply varying channel condition and a slowly varying channel condition.

FIG. 5 shows exemplary two types of resource blocks with different bandwidths. In the illustration, two smaller resource blocks (with the size of $F_{RB1} \times T_{RB}$) and two larger resource blocks (with the size of $F_{RB2} \times T_{RB}$) are arranged alternately on the frequency axis. The pattern determination unit 34 may determine an assignment pattern of resource blocks based on a CQI reported from the user apparatus. However, the present invention is not limited to the CQI and may use any other indicator indicative of the downlink channel condition. For example, as illustrated in FIG. 6, a channel condition may slowly vary in a range $B_1$ while it may sharply vary in a range $B_2$. In this case, a relatively large size of resource block is preferably assigned to the range $B_1$, and on the other hand, a relatively small size of resource block is preferably assigned to the range $B_2$. Such an assignment can be applied to not only the frequency axis but also the time frequency. In this embodiment, the pattern determination unit 34 selects an appropriate assignment pattern among a predefined number of assignment patterns stored in the memory 35 in advance based on the downlink CQI. These assignment patterns may be identified with some numbers (pattern numbers).

Alternatively, the pattern determination unit 34 may select an assignment pattern depending on the type of transmitted data. For example, it is preferable that a larger size of resource block be provided for transmission of a relatively large size of data while a smaller size of resource block be provided for transmission of a relatively small size of data such as voice data (VoIP). The assignment pattern may be selected depending on actual transmitted data. More preferably, a more appropriate assignment pattern may be selected based on both the CQI and the transmitted data.

The user apparatus reconstructs a received signal based on the assignment pattern selected in the base station. The pattern determination unit in the base station in FIG. 3 determines which assignment pattern of resource blocks should be used and supplies the determined assignment pattern to the scheduler 33. Then, this information (which may be a pattern number) and scheduling information are transmitted in an appropriate control channel to the user apparatus. The user apparatus extracts the pattern number and the scheduling information by reconstructing the received control channel. The pattern number is supplied to the assignment pattern identification unit 43 in FIG. 4. The assignment pattern identification unit 43 provides the resource identification unit 42 with information of an assignment pattern identified by the supplied pattern number. The resource identification unit 42 identifies resource blocks with data destined for the user apparatus in accordance with the identified assignment pattern and the scheduling information and reports the resource blocks to the OFDM reception unit 41. The OFDM reception unit 41 extracts and reconstructs a data channel destined for the user apparatus in accordance with the information.

In FIG. 5, the exemplary assignment of the smaller resource blocks and the larger resource blocks may be illustrated in such a way that it remains unchanged over time, but the present invention is not limited to it. For example, the assignment pattern may be changed over a long time period T. For example, if $T_{RB}$ is set to be about 0.5 ms, the update period T of the assignment pattern may be set to be about 100 ms.

Figure 7:
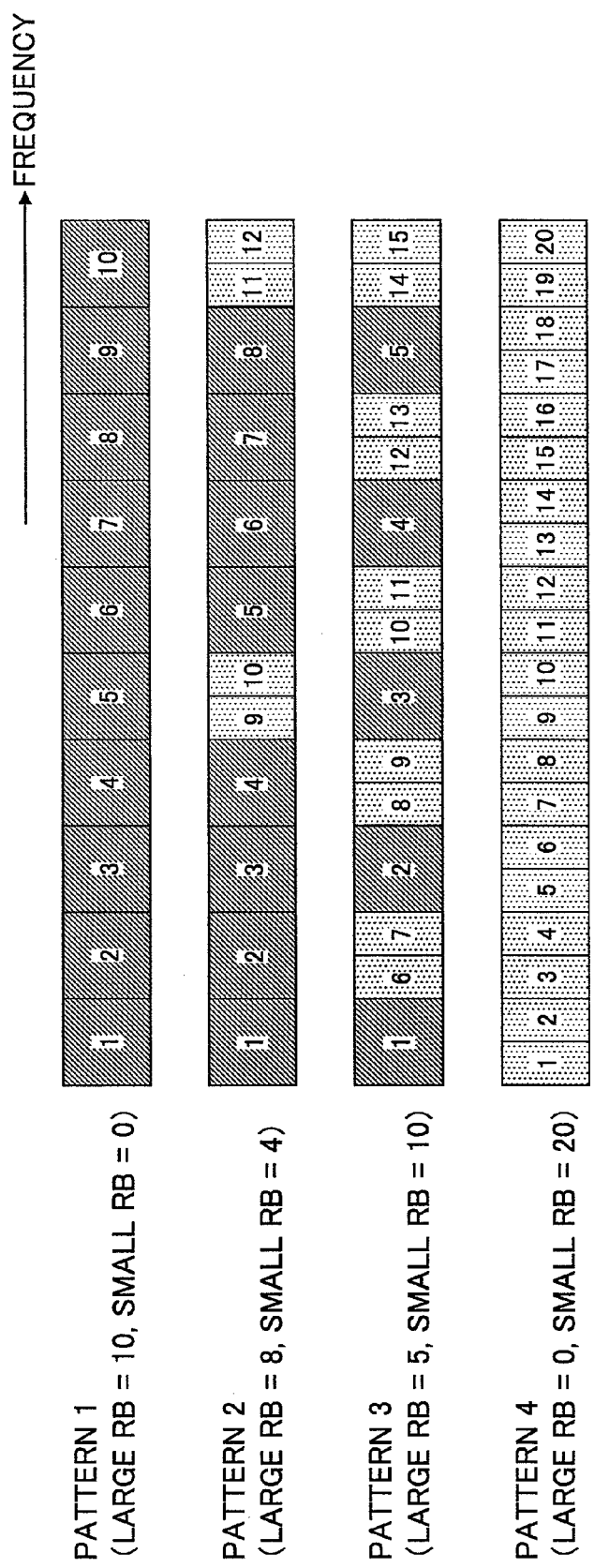
FIG. 7 shows an exemplary assignment pattern of resource blocks.

FIG. 7 shows an exemplary assignment pattern of resource blocks. In the illustration, the resource blocks are numbered with consecutive numbers in the frequency axis direction regardless of the size of the resource blocks, but the resource blocks may be identified with combinations of numbers and some information to distinguish the different sizes of the resource blocks. Also, it is not necessary to fix the positions and the number of the resource blocks in the time axis and the frequency axis in a single update period. Also, one or more of the illustrated assignment patterns and any other suitable assignment patterns may be included in the update period T. Anyway, it is sufficient to fix a selected assignment pattern in an update period. In order to adapt the resource block size and the resource block position for various channel conditions and communication conditions, it may be preferable to select suitable assignment patterns depending on the variations without fixing a certain assignment pattern in one period. In this case, however, there may be an increase in the information amount of signaling channels (control channels) to indicate which assignment pattern is currently being applied. In order to reduce the information amount of the control channels, it is preferable to use a limited number of assignment patterns and fix a certain assignment pattern in a single update period. In this case, the assignment patterns can be identified with only the pattern numbers, for example. In other words, the control channels according to this embodiment needs only two additional bits for four assignment patterns. In this embodiment, the assignment pattern is transmitted to the user apparatus for each update period, but the update period may be set to be relatively long as stated above. Thus, the update of the assignment pattern may be transmitted in an L1/L2 signaling message or in an L3 message.

Figure 8:
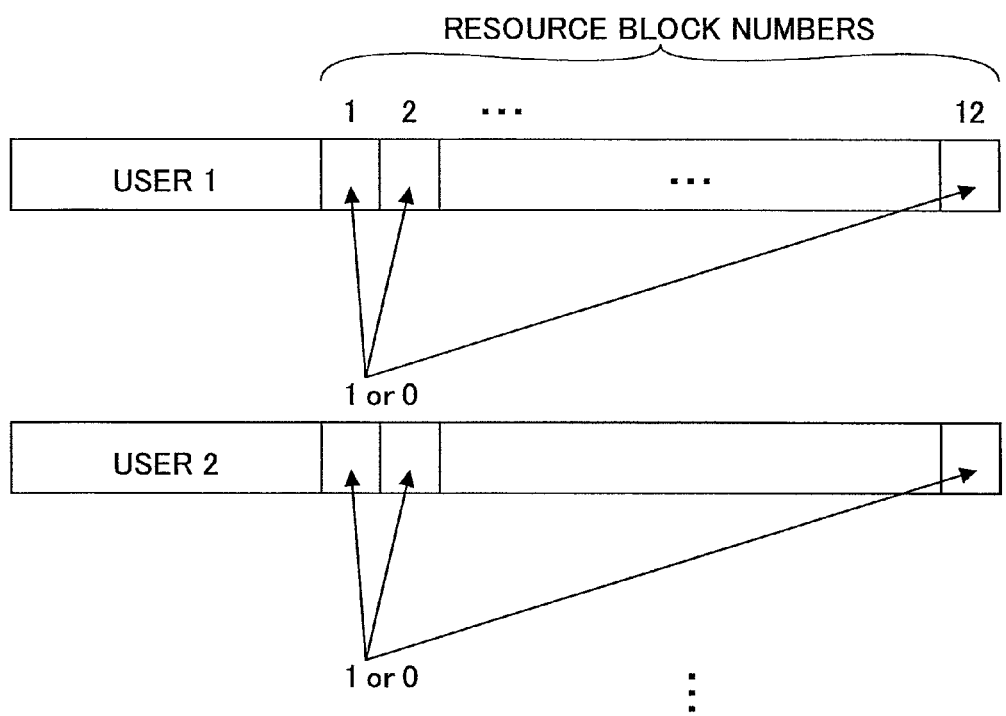
FIG. 8 shows exemplary resource blocks specified in accordance with a bit mapping method.

FIG. 8 shows exemplary resource blocks specified in accordance with bitmapping method. As illustrated, information indicative of assignment states of individual resource blocks is provided for each user apparatus. In other words, for the user apparatus 1, information (0 or 1) indicating whether the first resource block is assigned to the user apparatus 1 is provided, and information (0 or 1) indicating whether the second resource block is assigned to the user apparatus 1, and so on. For example, "1" may indicate that the associated resource block is assigned to the user apparatus 1 while "0" may indicate that the associated resource block is not assigned to the user apparatus 1. Similarly, the assignment information of the individual resource blocks is provided for each of the user apparatuses 2, 3 and so on.

Figure 9:
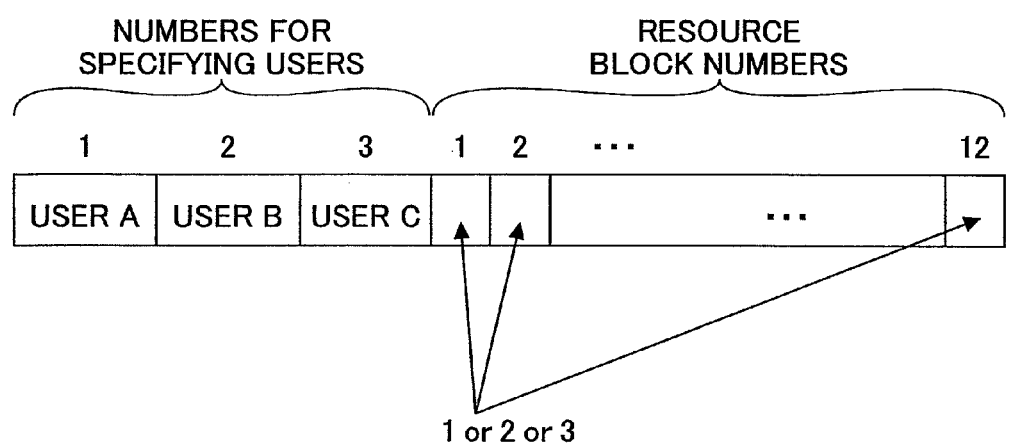
FIG. 9 shows exemplary resource blocks specified in accordance with a table lookup method.

FIG. 9 shows exemplary resource blocks specified in accordance with table lookup method. In the illustration, some numbers for identifying the user apparatuses A, B, C are provided. In the illustration, the numbers 1, 2, 3 are assigned to the user apparatuses A, B, C, respectively. Then, it is expressly shown which user apparatus is assigned for each resource block. Specifically, it is specified which user apparatuses are assigned for the first resource block, the second resource block and so on. From the viewpoint of efficient indication of only assigned information, the table lookup method may be more advantageous.

In the above embodiments, two different resource block sizes are provided, but more than two resource block sizes may be provided as needed. Also, resource blocks with not only different bandwidths but also resource blocks with different transmission time periods $T_{RB}$ may be provided. In order to address fading variations in the frequency axis by priority, however, it may be more important to provide the resource blocks with different bandwidths. Also in the above embodiments, the larger size of resource block is configured to be twice as large as the smaller size of resource block. In general, one resource block size may be set to be an integral multiple of the other resource block size. For example, if the bandwidth of a larger size of resource block is set to be an integral multiple of the bandwidth of a smaller size of resource block, the resulting assignment pattern including a mixture of different sizes of resource blocks can always occupy the same band in the entire system. This is preferable from the viewpoint of efficiency of band utilization.

Although the present invention has been described with reference to the certain embodiments, it will be appreciated by those skilled in the art that the embodiments are simply illustrative and that variations, modifications, alterations may be made to the embodiments. The present invention has been described with reference to specific numerical values to provide thorough understanding of the present invention, but unless specifically indicated, these numerical values are simply illustrative and any other suitable values may be used. Separation of the distinct embodiments is not substantial to the present invention, and two or more of the embodiments may be combined as needed. For convenience, apparatuses according to embodiments of the present invention have been described in functional block diagrams, but the apparatuses may be implemented in hardware, software or combinations thereof. The present invention is not limited to the above embodiments, and variations, modifications and alterations may be made within the spirit of the present invention.

This international patent application is based on Japanese Priority Application No. 2006-169428 filed on Jun. 19, 2006, the entire contents of which are hereby incorporated by reference.

The invention claimed is:

1. A base station, comprising:
a scheduler determining a resource block to assign a data channel for a user apparatus, wherein a plurality of resource blocks each occupying a predefined band and a predefined period are arranged in a frequency axis direction in a system band and each of the resource blocks is assigned to a single user apparatus; and
a transmission unit generating a transmission signal for transmitting the data channel assigned to the resource block determined by the scheduler and transmitting the transmission signal to the user apparatus,
wherein the scheduler defines a first assignment unit having a predefined size and a second assignment unit having as twice size as the first assignment unit as assignment units of the resource blocks,
a plurality of resource blocks having the first assignment unit allowed to assign to a single user apparatus are locally arranged in two consecutive resource blocks in a system band, and
resource block groups each consisting of two locally arranged consecutive resource blocks having the first assignment unit are arranged to separate one of the resource block groups from an adjacent one of the resource block group by one resource block having the second assignment unit such that the resource block groups are globally distributed over the system band.

2. The base station as claimed in claim 1, wherein the scheduler arranges the resource blocks by combining a resource block having the first assignment unit and a resource block having the second assignment unit in the system band without overlapping.

3. The base station as claimed in claim 1, wherein in the scheduler, the assignment of the resource blocks arranged in the frequency axis direction is limited to a predefined number of assignment pattern options.

4. The base station as claimed in claim 1, wherein in the scheduler, the assignment of the resource blocks to each user apparatus is represented in the assignment units of the resource blocks in accordance with bit mapping method.

5. The base station as claimed in claim 1, wherein in the scheduler, the assignment of the resource blocks is represented to indicate which user apparatus each of the resource blocks is assigned to.

6. A transmission method, comprising the steps of:
determining a resource block to assign a data channel for a user apparatus, wherein a plurality of resource blocks each occupying a predefined band and a predefined period are arranged in a frequency axis direction in a system band and each of the resource blocks is assigned to a single user apparatus;
generating a transmission signal for transmitting the data channel assigned to the determined resource block; and
transmitting the transmission signal to the user apparatus,
wherein the step of determining comprises defining a first assignment unit having a predefined size and a second assignment unit having as twice size as the first assignment unit as assignment units of the resource blocks,
a plurality of resource blocks having the first assignment unit allowed to assign to a single user apparatus are locally arranged in two consecutive resource blocks in a system band, and
resource block groups each consisting of two locally arranged consecutive resource blocks having the first assignment unit are arranged to separate one of the resource block groups from an adjacent one of the resource block group by one resource block having the second assignment unit such that the resource block groups are globally distributed over the system band.

7. The transmission method as claimed in claim 6, wherein the step of determining comprises arranging the resource blocks by combining a resource block having the first assignment unit and a resource block having the second assignment unit in the system band without overlapping.

8. The transmission method as claimed in claim 6, wherein in the step of determining, the assignment of the resource blocks arranged in the frequency axis direction is limited to a predefined number of assignment pattern options.

9. The transmission method as claimed in claim 6, wherein in the step of determining, the assignment of the resource blocks to each user apparatus is represented in the assignment units of the resource blocks in accordance with bit mapping method.

10. The transmission method as claimed in claim 6, wherein in the step of determining, the assignment of the resource blocks is represented to indicate which user apparatus each of the resource blocks is assigned to.

11. A user apparatus, comprising:
a reception unit receiving a signal including a data channel assigned by a base station to a resource block, wherein a plurality of resource blocks each occupying a predefined band and a predefined period are arranged in a frequency axis direction in a system band and each of the resource blocks is assigned to a single user apparatus; and
a processing unit deriving the data channel from the signal received by the reception unit,
wherein the base station defines a first assignment unit having a predefined size and a second assignment unit having as twice size as the first assignment unit as assignment units of the resource blocks in the signal received by the reception unit,
a plurality of resource blocks having the first assignment unit allowed to assign to a single user apparatus are locally arranged in two consecutive resource blocks in a system band, and
resource block groups each consisting of two locally arranged consecutive resource blocks having the first assignment unit are arranged to separate one of the resource block groups from an adjacent one of the resource block group by one resource block having the second assignment unit such that the resource block groups are globally distributed over the system band.

12. A reception method, comprising the steps of:
receiving a signal including a data channel assigned by a base station to a resource block, wherein a plurality of resource blocks each occupying a predefined band and a predefined period are arranged in a frequency axis direction in a system band and each of the resource blocks is assigned to a single user apparatus; and
deriving the data channel from the signal received by the step of receiving,
wherein the base station defines a first assignment unit having a predefined size and a second assignment unit having as twice size as the first assignment unit as assignment units of the resource blocks in the signal received at the step of receiving,
a plurality of resource blocks having the first assignment unit allowed to assign to a single user apparatus are locally arranged in two consecutive resource blocks in a system band, and
resource block groups each consisting of two locally arranged consecutive resource blocks having the first assignment unit are arranged to separate one of the resource block groups from an adjacent one of the resource block group by one resource block having the second assignment unit such that the resource block groups are globally distributed over the system band.

* * * * *